(12) United States Patent
Sen et al.

(10) Patent No.: US 6,236,929 B1
(45) Date of Patent: May 22, 2001

(54) AUTO-CRUISE CONTROLLER

(75) Inventors: Naoto Sen; Akira Itoh; Kimiaki Yamada, all of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/409,378

(22) Filed: Sep. 30, 1999

(30) Foreign Application Priority Data

Oct. 16, 1998 (JP) .................................................. 10-331873

(51) Int. Cl.[7] .............................. G05D 16/00; G06F 7/00; G06F 17/00; G06F 19/00
(52) U.S. Cl. ................................. 701/93; 701/51; 701/84; 701/85; 701/87; 701/91; 701/94; 123/349; 123/436; 123/479; 180/174; 180/175; 180/176; 180/178; 180/179; 180/197; 477/107; 477/108; 477/110; 477/174; 477/408
(58) Field of Search ............................. 701/84, 93, 51, 701/85, 87, 91, 94, 95; 180/174, 175, 176, 178, 179, 197; 123/436, 349, 479; 477/108, 107, 110, 174, 408

(56) References Cited

U.S. PATENT DOCUMENTS

| | | | |
|---|---|---|---|
| 4,169,437 | * | 10/1979 | Fleischer .............................. 123/102 |
| 4,849,892 | * | 7/1989 | McCombie ....................... 364/426.04 |
| 4,896,267 | * | 1/1990 | Frantz et al. ..................... 364/426.04 |
| 5,099,941 | * | 3/1992 | Kawano et al. ....................... 180/179 |
| 5,129,475 | * | 7/1992 | Kawano et al. ....................... 180/179 |
| 5,154,250 | * | 10/1992 | Murai .................................... 180/179 |
| 5,243,526 | * | 9/1993 | Ito et al. .......................... 364/426.02 |
| 5,245,542 | * | 9/1993 | Itoh et al. ........................ 364/426.02 |
| 5,394,954 | * | 3/1995 | Tashiro et al. ....................... 180/178 |
| 5,507,705 | * | 4/1996 | Hara ..................................... 447/408 |
| 5,673,668 | * | 10/1997 | Pallett et al. ......................... 123/436 |
| 5,685,801 | * | 11/1997 | Benford et al. ....................... 477/108 |
| 5,778,331 | * | 7/1998 | Leising et al. ......................... 701/66 |
| 5,957,991 | * | 9/1999 | Yasuda .................................. 701/84 |
| 5,978,726 | * | 11/1999 | Takeda et al. ......................... 701/84 |
| 6,017,290 | * | 1/2000 | Kinoshita et al. ................... 477/108 |
| 6,067,495 | * | 5/2000 | Fliearman et al. ..................... 701/55 |
| 6,104,976 | * | 8/2000 | Nakamura ............................... 701/95 |
| 6,125,321 | * | 9/2000 | Tabata et al. ........................... 701/97 |
| 6,141,618 | * | 10/2000 | Yamashita et al. .................... 701/84 |

* cited by examiner

Primary Examiner—William A. Cuchlinski, Jr.
Assistant Examiner—Ronnie Mancho
(74) Attorney, Agent, or Firm—Armstrong, Westerman, Hattori, McLeland & Naughton, LLP

(57) ABSTRACT

An auto-cruise controller to control the throttle angle of an engine so that the actual vehicle speed is equal to the target vehicle speed. In the controller, the pressure control of a lock-up clutch of an automatic transmission is conducted based on an amount of control of the lock-up pressure calculated corresponding to the traveling conditions of the vehicle when the throttle is fully closed, and when the vehicle is descending a slope during the auto-cruise control.

2 Claims, 10 Drawing Sheets

AUTO-CRUISE CONTROLLER

BACKGROUND OF THE INVENTION

1. Field of the Invention

The present invention relates to an auto-cruise controller to control the travel speed of a vehicle so that the actual speed is equal to the target speed.

2. Description of the Related art

Generally, in the auto-cruise controller of prior systems, the target speed of the vehicle is set corresponding to the speed of the vehicle when an auto-cruise switch is set as the vehicle travels and the throttle angle of an engine is calculated so that the detected actual vehicle speed is equal to the target vehicle speed, and the control is carried out with a predetermined control period so that a predetermined throttle angle can be obtained.

Then, when the vehicle comes to such a state that the target vehicle speed and the actual vehicle speed are almost balanced with each other with the fully closed throttle on a descending slope condition, fully closed and slightly opened conditions of the throttle repeatedly occur by the control of the auto-cruise, and as a result, the fuel-cut condition by the fully closed throttle and the return of the throttle to an opened condition are repeated, resulting in hunting of the fuel-cut.

Further, in the case where, while a switch is turned on in the deceleration direction during auto-cruising, the vehicle speed is decelerated at a predetermined deceleration, and when it is turned off, the target vehicle speed is downwardly adjusted; so-called coast adjustment is conducted, or in the case where the actual vehicle speed is converged into the target vehicle speed by a predetermined deceleration when the actual vehicle speed is increased some degree higher than the target vehicle speed by the temporary acceleration at the time of passing or the like, the constant deceleration control is carried out. In this case also, the fully closed condition and the slightly opened condition of the throttle are repeated in its constant deceleration control, resulting in hunting of the fuel-cut.

The problem to be solved is as follows: only by controlling the throttle angle of an engine so that the actual vehicle speed is equal to the target vehicle speed, a situation occurs in which the fully closed condition and the slightly opened condition of the throttle are repeated at the time of descending a slope or the constant deceleration control of the vehicle in the auto-cruising, and the hunting of the fuel-cut occurs.

SUMMARY OF THE INVENTION

An object of the present invention is to avoid the situation in which the fully closed condition and the slightly opened condition of the throttle are repeated at the time of slope descending of the vehicle and hunting of the fuel-cut occurs, in the auto-cruise controller by which the throttle angle is controlled so that the actual vehicle speed is equal to the target vehicle speed.

In order to achieve the above object, according to the present invention, there is provided an auto-cruise controller in which a target vehicle speed is set, and a throttle angle of an engine is controlled so that a detected actual vehicle speed is equal to the target vehicle speed, the auto-cruise controller comprising: means for controlling a pressure of a lock-up clutch in an automatic transmission with a lock-up mechanism; means for judging a slope descending condition of a vehicle during an auto-cruising control; and means for calculating an amount to be controlled of the lock-up clutch pressure correspondingly to a difference between the actual vehicle speed and the target vehicle speed at the time of judgement of the slope descending condition, wherein the pressure control of the lock-up clutch is performed based on the amount to be controlled of the lock-up clutch pressure, which is calculated at the time of the judgement of the slope descending condition.

DETAILED DESCRIPTION OF THE PREFERRED EMBODIMENT

Figure 1:
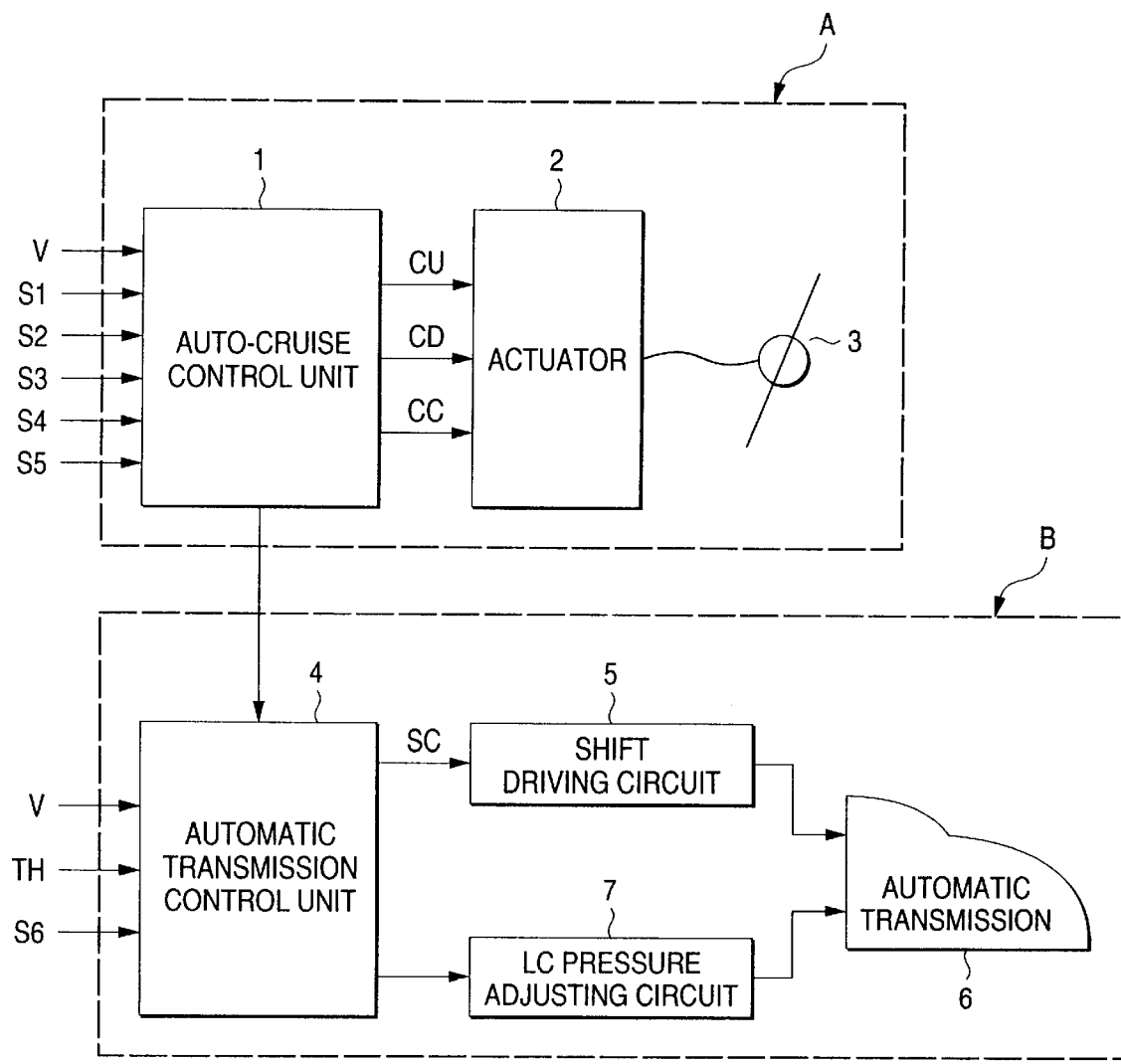
FIG. 1 is a structural block diagram showing an embodiment of an auto-cruise controller according to the present invention.

The auto-cruise controller according to the present invention is structured by an auto-cruise control section A and an automatic transmission control section B, as shown in FIG. 1.

The auto-cruise control section A is basically structured by an auto-cruise control unit (ECU) 1 in which: a vehicle speed signal V from a vehicle speed sensor to detect the actual vehicle speed correspondingly to a set signal S1 of an auto-cruise switch is read; the target vehicle speed is set by storing the actual vehicle speed at that time in an internal memory; and an actuator 2 to adjust an angle of a throttle valve 3 of an engine is controlled so that the actual vehicle speed is equal to the target vehicle speed, with a predetermined control period.

Further, in the auto-cruise control unit 1, corresponding to a cancel signal S2 by a cancel switch and a brake signal S3 by a brake switch, each of control signals CC, CU, and CD of the auto-cruise control is not outputted to the actuator 2.

Further, in the auto-cruise control unit 1, corresponding to a resume signal S4 by a resume switch, the previous auto-cruise control cancelled by the operation of the cancel switch or the brake operation is re-started.

Furthermore, in the auto-cruise control unit 1, the acceleration or deceleration control signal CU or CD is given to the actuator 2 while the acceleration or deceleration control signal S5 is given by the operation in the acceleration or deceleration direction of an automatic return type coast switch, and during that time, the throttle valve 3 is driven to open or close side, and the vehicle is accelerated or decelerated, and the actual vehicle speed when the switch operation is stopped, is determined as a new target vehicle speed, updated and stored in the internal memory, and after that, the constant speed control corresponding to the renewed target vehicle speed is conducted.

As the actuator 2, for example, a diaphragm type one in which the negative pressure of an intake manifold of the engine is supplied, is used. In this type actuator, when a normally opened vent valve for deceleration is closed correspondingly to the deceleration control signal CD outputted from the cruise control unit 1, the negative pressure in the negative pressure chamber is lowered and the throttle valve 3 is driven to a close-side. Further, when a normally closed vacuum valve for acceleration is opened correspondingly to the acceleration control signal CU outputted from the cruise control unit 1, the negative pressure in the negative pressure chamber is raised and the throttle valve 3 is driven to an open-side. When the acceleration or deceleration control signal CU or CD is outputted, the control signal CC is outputted from the auto-cruise control unit 1 to the actuator 2, and a normally opened safety valve for the release of the auto-cruise control is closed correspondingly to the control signal CC, and the negative pressure in the negative pressure chamber is held.

The automatic transmission control section B is, basically, composed of an automatic transmission control unit (ECU) 4 in which: a vehicle speed signal V and a throttle angle signal TH from a throttle angle sensor to detect an angle of the throttle valve of the engine, are read in; the expected acceleration is selected from the table previously stored in the internal memory; by discriminating a degree of the deference from the actual acceleration at that time by a threshold value, it is judged whether the road on which the vehicle is traveling at present, is a flat road, ascending slope or descending slope; according to the judgement result, a map of a shift characteristic which is previously set at the optimum correspondingly to each road, is selected; and the shift position at that time is determined according to the selected shift map, and a shift drive circuit 5 to conduct shift switching at the automatic transmission 6 in the predetermined manner, correspondingly to the shift control signal SC outputted from the automatic transmission control unit 4.

Figure 2:
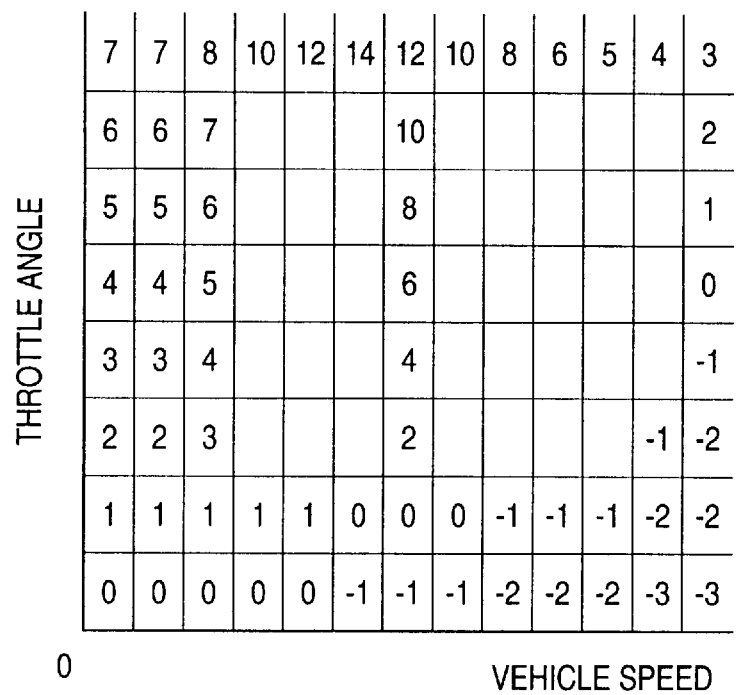
FIG. 2 is a view showing an example of the content of the table setting of the expected acceleration determined by the vehicle speed and the throttle angle.

FIG. 2 shows an example of the content set in the table of the expected acceleration determined by the vehicle speed V and the throttle angle Th.

Figure 3:
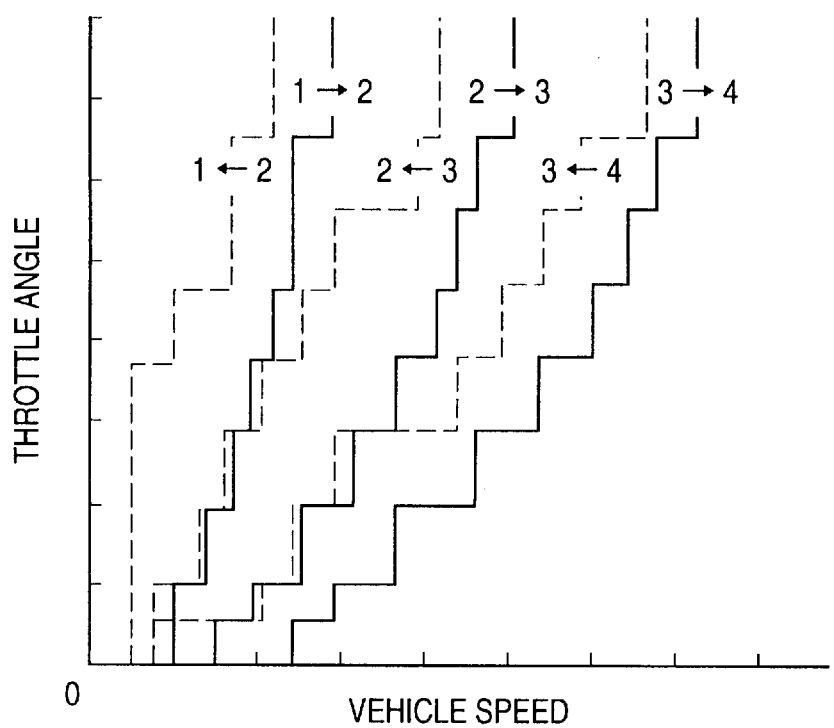
FIG. 3 is a graph showing an example of the 4-speed stage correspondent shift characteristic corresponding to the vehicle speed and the throttle angle which are set to the optimum values corresponding to road conditions.

FIG. 3 shows an example of the shift characteristic of 4-speed stage correspondence, corresponding to the vehicle speed V and throttle angle Th which are set at the optimum correspondingly to the roads of flat road, ascending slope, or descending slope. In this case, the hysteresis characteristic is provided between the time of shift-up and the time of shift-down.

The actual acceleration is determined by calculation of a change of the actual vehicle speed per a unit time in the automatic transmission control unit 4.

In that case, the automatic transmission control unit 4 reads a selector signal S6 from a range selector switch in the automatic transmission 6, selects a correction factor for the actual acceleration from the table previously stored in the internal memory correspondingly to each range, and conducts range correction for the calculated actual acceleration.

Figure 4:
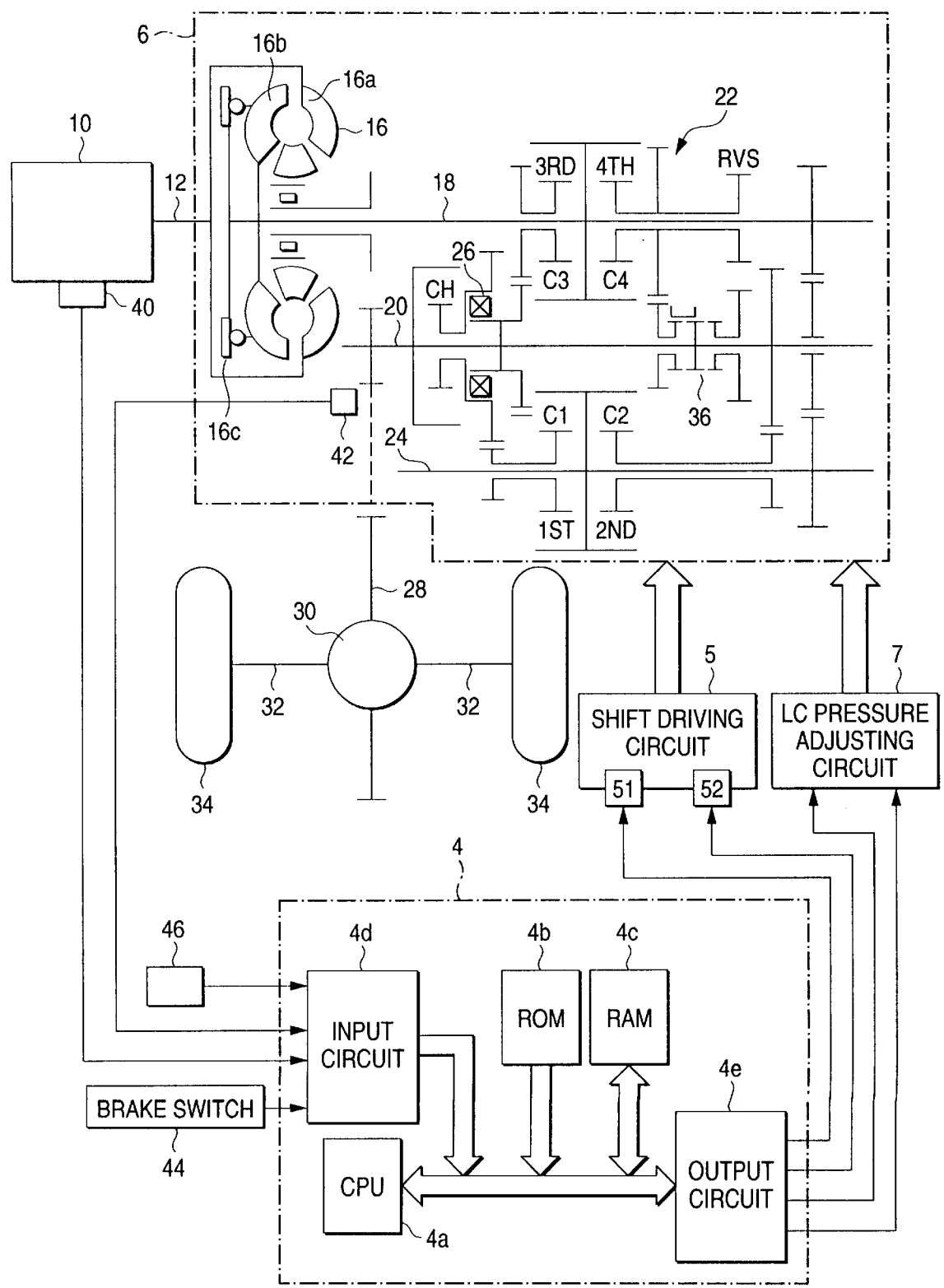
FIG. 4 is a block diagram showing a concrete structural example of an automatic transmission control section in the embodiment.

FIG. 4 shows a concrete structure of the automatic transmission control section B.

In this structure, the output of an engine 10 is sent to the automatic transmission 6 through a shaft 12, and is transmitted to a main shaft 18 through a pump impeller 16a and a turbine runner 16b of a torque converter 16. A gear mechanism 22 composed of 4-stage gears for advance and 1-stage gear for reverse is provided between the main shaft 18 and a counter shaft 20, and a secondary shaft 24 is arranged in parallel to the counter shaft 20. Hydraulic clutches C1–C4 are arranged on each gear stage. In the drawing, a symbol CH is a hydraulic clutch to bypass the one-way clutch 26. The output of the automatic transmission 6 is sent to a differential device 30 through a final gear 28, and drives driving wheels 34 through a drive shaft 32. The hydraulic clutch C4 is used for the advance and reverse, and when the selector 36 is located at the left side in the drawing, the advance gear stage is established and when located at the right side, the reverse gear stage is established through an idle gear, not shown.

A throttle angle sensor 40 to detect the angle of the throttle valve (not shown) is provided at a portion of the throttle valve arranged in an intake path of the engine 10. A vehicle speed sensor 42 to detect the vehicle speed from the rotation speed of the shaft 20 is provided at a portion of the counter shaft 20 of the automatic transmission 6. A brake switch 44 to detect the presence or absence of the brake operation depending on whether a brake pedal (not shown) is operated or not, is provided at a portion of the brake pedal. A range selector switch 46 to detect each range position of P, R, N, D, 3, 2, 1 which is selected by a lever by the driver, is provided at a portion of the range selector (not shown) of the automatic transmission 6.

The automatic transmission control unit (ECU) 4 is structured by a microcomputer composed of a CPU 4a, ROM 4b, RAM 4c, input circuit 4d, and output circuit 4e. When angle or closing of solenoid valves 51 and 52 in a hydraulic shift driving circuit 5 is appropriately conducted by a shift control signal SC outputted from the automatic transmission control unit 4, a shift valve (not shown) is switched, and release or connection of the hydraulic clutch of a predetermined gear stage is conducted.

In the auto-cruise controller structured as described above, in the present invention, as shown in FIGS. 1 and 4, a lock-up clutch pressure adjusting circuit 7 by which pressure adjustment of a lock-up clutch 16c in the automatic transmission 6 with a lock-up mechanism can be carried out under the control of the automatic transmission control unit 4, is provided.

In the present invention, in the automatic transmission control unit 4, a means for judging a slope descending condition of the vehicle during the auto-cruising control, and a means for calculating an amount to be controlled of the lock-up clutch pressure correspondingly to the difference between the actual vehicle speed and the target vehicle speed at the time of the judgement of the slope descending condition, are provided, and the pressure control of the lock-up clutch is performed based on an amount to be controlled of the lock-up clutch pressure, which is calculated at the time of the judgement of the slope descending condition.

The principle of the present invention will be described below.

Figure 5:
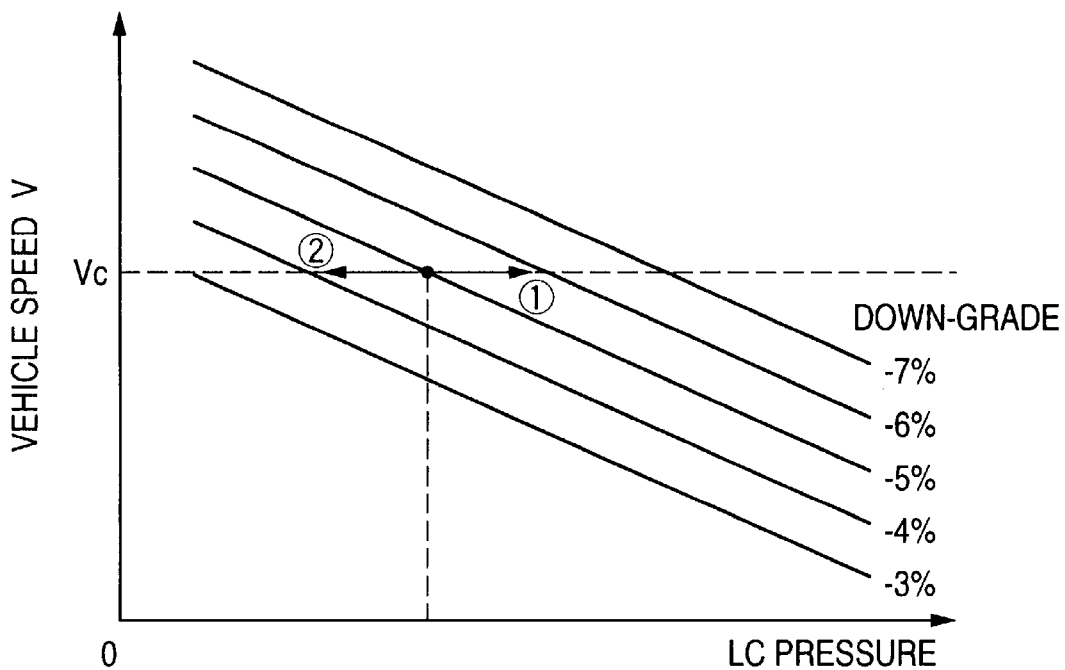
FIG. 5 is a graph showing the characteristic of the vehicle speed V to the LC pressure when the throttle is fully closed, on the descending slope traveling condition of the vehicle.

As shown in FIG. 5, the characteristic of the lock-up clutch pressure (hereinafter, referred to as LC pressure) at the time of a fully closed throttle in the traveling on the descending slope condition of the vehicle, and the vehicle speed V is in the relationship that the more increased the LC pressure is, the more decreased the vehicle speed is. Further, the characteristic has the relationship that the more the grade of the slope at the time of slope descending is increased, the more the vehicle speed V is increased when the LC pressure is not changed.

Accordingly, according to the characteristic, the vehicle speed V changes depending on a change of the grade when the throttle is fully closed at the traveling on the slope descending condition, and the vehicle speed V at that time can be kept constant by the control of the LC pressure.

Concretely, as shown by ① in FIG. 5, when the grade at the slope descending changes from −5% to −6%, the LC pressure maybe increased in order to travel at the constant vehicle speed Vc. Further, as shown by ② in FIG. 5, when the grade at the slope descending changes from −5% to −4%, the LC pressure may be decreased in order to travel at the constant vehicle speed Vc.

Figure 6:
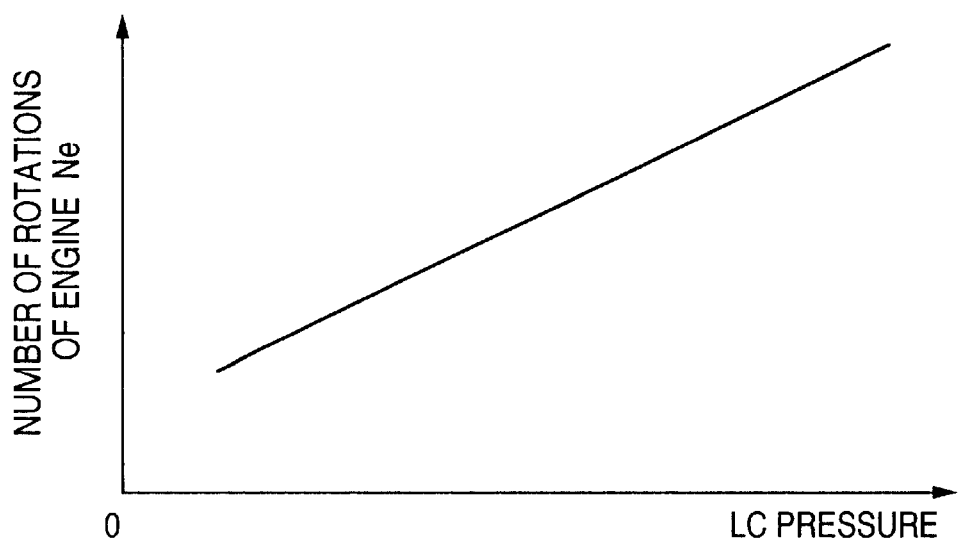
FIG. 6 is a graph showing the characteristic of the number of rotations Ne of the engine to the LC pressure when the throttle is fully closed.
Figure 7:
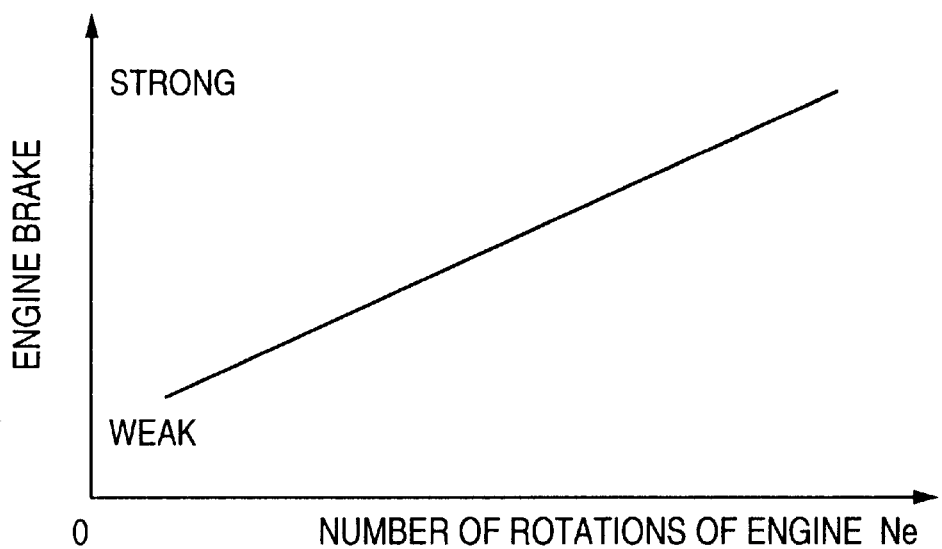
FIG. 7 is a graph showing the characteristic of the engine brake to the number of rotations Ne of the engine when the throttle is fully closed.
Figure 8:
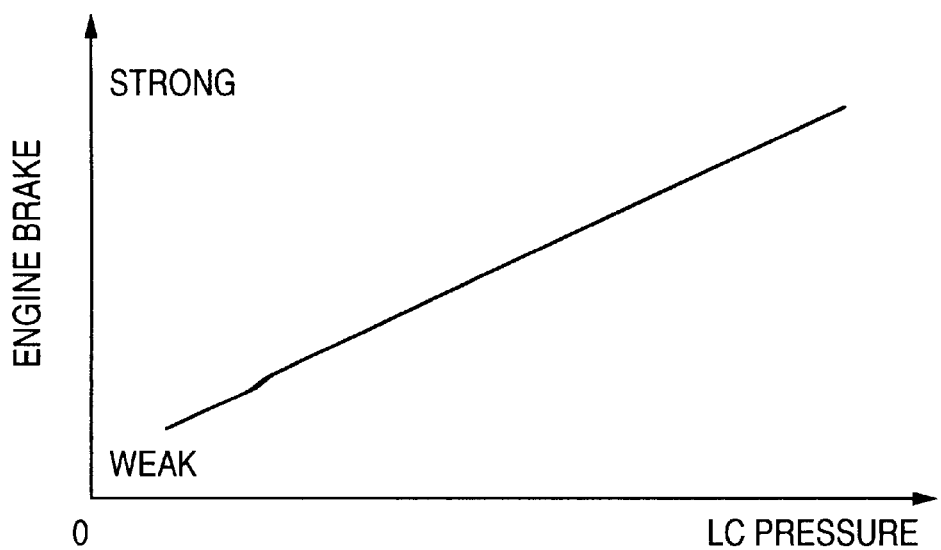
FIG. 8 is a graph showing the characteristic of the engine brake to the LC pressure when the throttle is fully closed.

Further, as shown in FIGS. 6 and 7, generally, when the LC pressure is increased when the throttle is fully closed, the number of rotations Ne of the engine is increased, and when the number of rotations Ne of the engine is increased, the effect of the engine brake is enhanced. On the contrary, when the LC pressure is decreased, the number of rotations Ne of the engine is lowered, and when the number of rotations Ne of the engine is lowered, the engine brake is weakened. Accordingly, as shown in FIG. 8, when the LC pressure is increased when the throttle is fully closed, the engine brake is strengthened, and when the LC pressure is decreased, the engine brake is weakened.

In the present invention, by using such a characteristic, the engine brake is adjusted by controlling the LC pressure at the traveling on the slope descending condition of the vehicle, thereby to keep the constant vehicle speed Vc.

According to this, because the vehicle can travel at the time of slope descending on the condition that the throttle is fully closed, the occurrence of hunting of fuel-cut in which fully closed and slightly opened condition of the throttle is frequently repeated when the grade changes, can be prevented.

Further, the engine brake can be adjusted by the LC pressure, so that the control of the LC pressure can be effective also at the time of the constant deceleration control.

Figure 9:
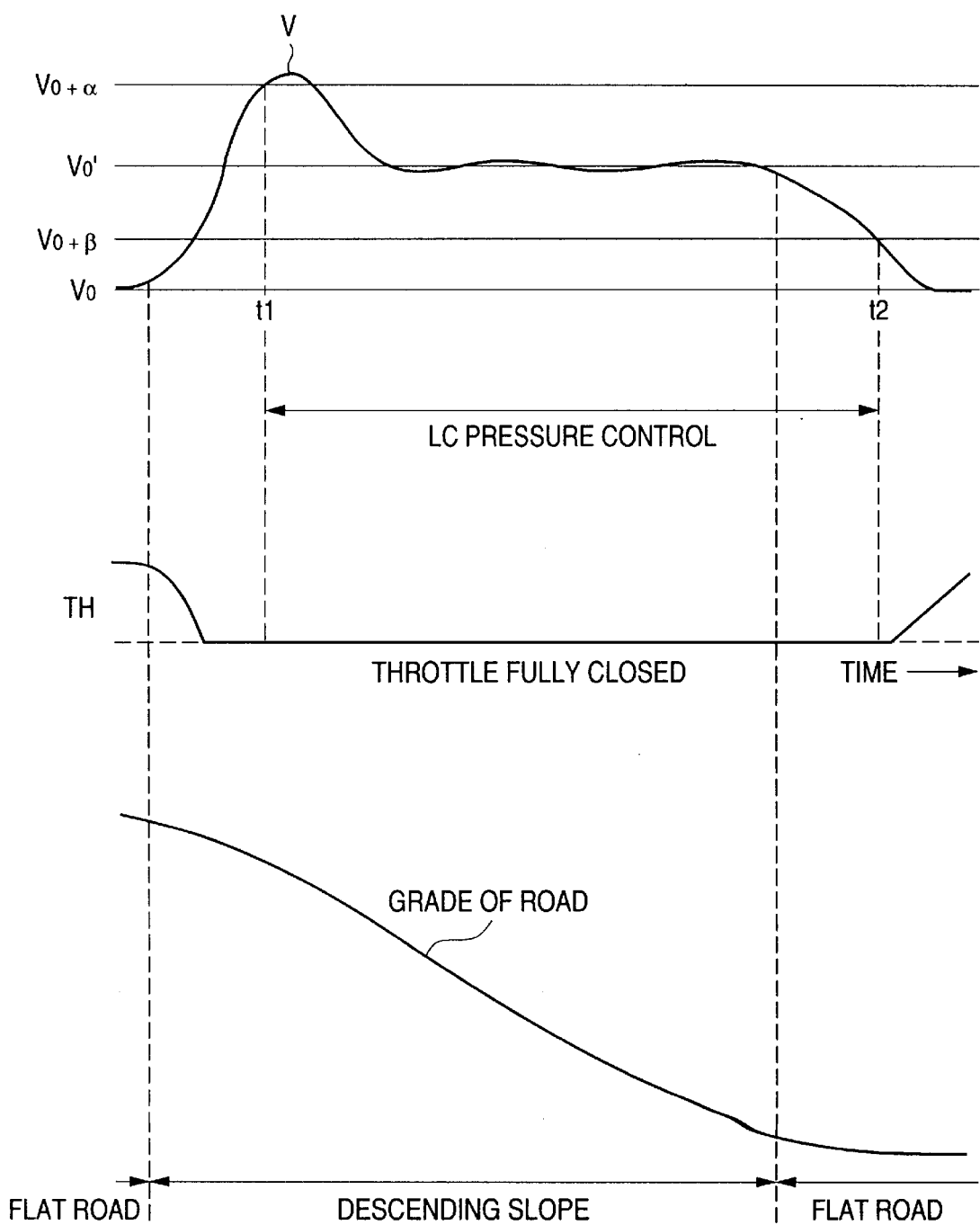
FIG. 9 is a characteristic view showing the LC pressure control condition at the time of the descending slope traveling of the vehicle.

FIG. 9 shows a condition of the LC pressure control of the vehicle at the time of slope descending during the auto-cruise control.

Herein, it is set that the LC pressure control is started at the time t1 when the vehicle comes from the flat road to the descending slope during the normal auto-cruise control by the adjustment of the throttle angle, and the actual vehicle speed V is largely out of the target vehicle speed Vo and increased, and under the condition that the throttle angle is fully closed, the actual vehicle speed is higher than the target vehicle speed V+α a which is set as the start point of the LC pressure control. The control of the LC pressure is conducted such that the actual vehicle speed V becomes the target vehicle speed Vo' at the time of slope descending, which is set to a little higher value than the target vehicle speed Vo.

Next, this system is set as follows: the LC pressure control is completed at the time t2 when the vehicle comes from the descending slope to the flat road, the actual vehicle speed V is out of the target vehicle speed Vo' and decreased, and the actual vehicle speed V is lower than the target vehicle speed V+β, which is set as the point of completion of the LC pressure control, and then, the vehicle speed returns to the condition of normal auto-cruise control.

The relationship among the target vehicle speed V+α as the starting point of the LC pressure control, the target vehicle speed Vo' at the time of slope descending under the LC pressure control, the target vehicle speed V+β as the completion point of the LC pressure control, and the target vehicle speed Vo under the normal auto-cruise control, is V+α>Vo'>V+β>Vo. At the time of normal auto-cruise control, by setting the value of β such that the throttle is fully closed when the actual vehicle speed V is the target vehicle speed V+β, the return from the LC pressure control to the normal auto-cruise control condition can be smoothly performed without any strange feeling.

Figure 10:
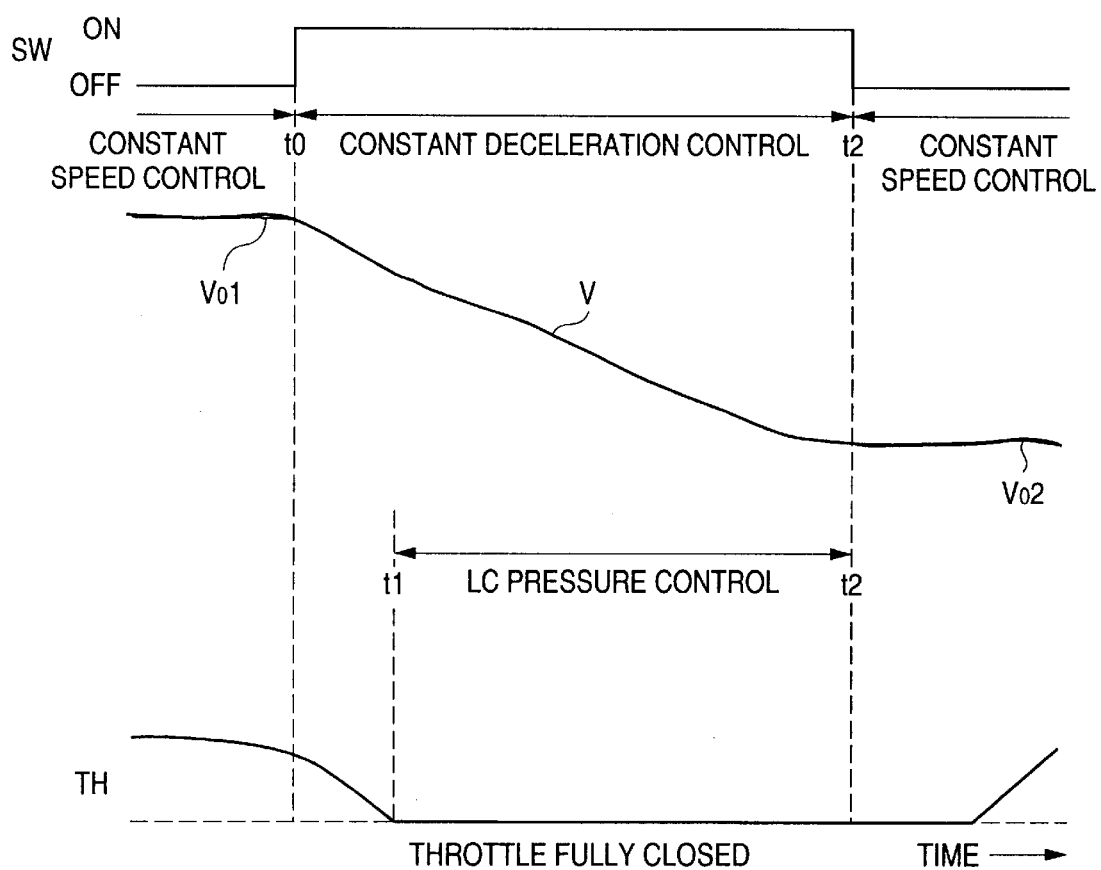
FIG. 10 is a characteristic view showing an example of the LC pressure control condition at the time of the constant deceleration control of the vehicle.

FIG. 10 shows an example of the LC pressure control condition during the constant deceleration control of the vehicle under the auto-cruise control.

Herein, during normal auto-cruise control in which the target vehicle speed on the flat road is Vo1, when a set switch SW in the deceleration direction is turned on at the time t0, the control is changed to the constant deceleration control mode, and the actual vehicle speed V is decreased at a predetermined deceleration, and the LC pressure control is started at the time t1 when the throttle is fully closed. After that, when the set switch is turned off at the time t2, the constant deceleration control under the LC pressure control is completed, and the normal auto-cruise control, in which the actual vehicle speed at that time is made to be a new target vehicle speed Vo2, is started.

Figure 11:
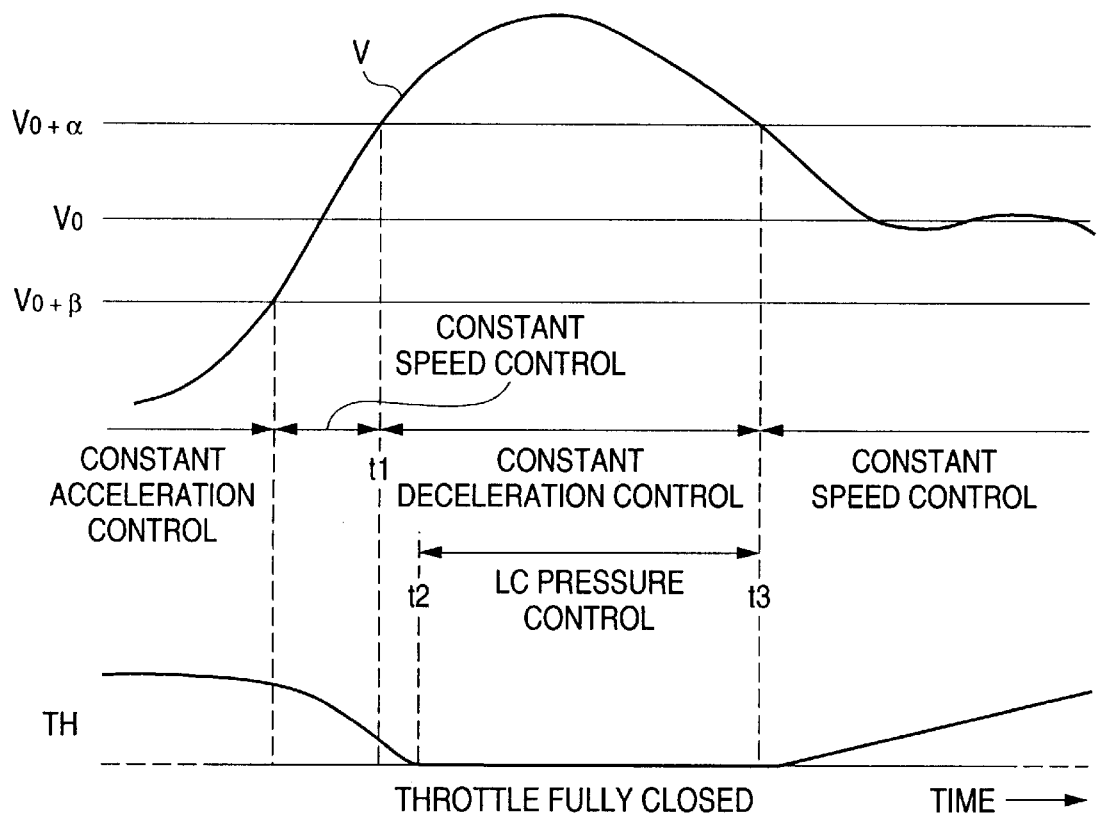
FIG. 11 is a characteristic view showing another example of the LC pressure control condition at the time of the constant deceleration control of the vehicle.

Further, FIG. 11 shows another example of the LC pressure control condition during the constant deceleration control of the vehicle.

Herein, at the time t1 when the actual vehicle speed is more than the target vehicle speed Vo+α during the constant speed control after the constant acceleration control, the control becomes the constant deceleration control condition, and at the time t2, when the throttle is fully closed, the LC pressure control is started. After that, when the actual vehicle speed V is lower than the target vehicle speed Vo+α at the time t3, the control becomes the constant speed control condition, and returns to the normal auto-cruise control. In this case, it is preferable that the value α has hysteresis in the specification.

Figure 12:
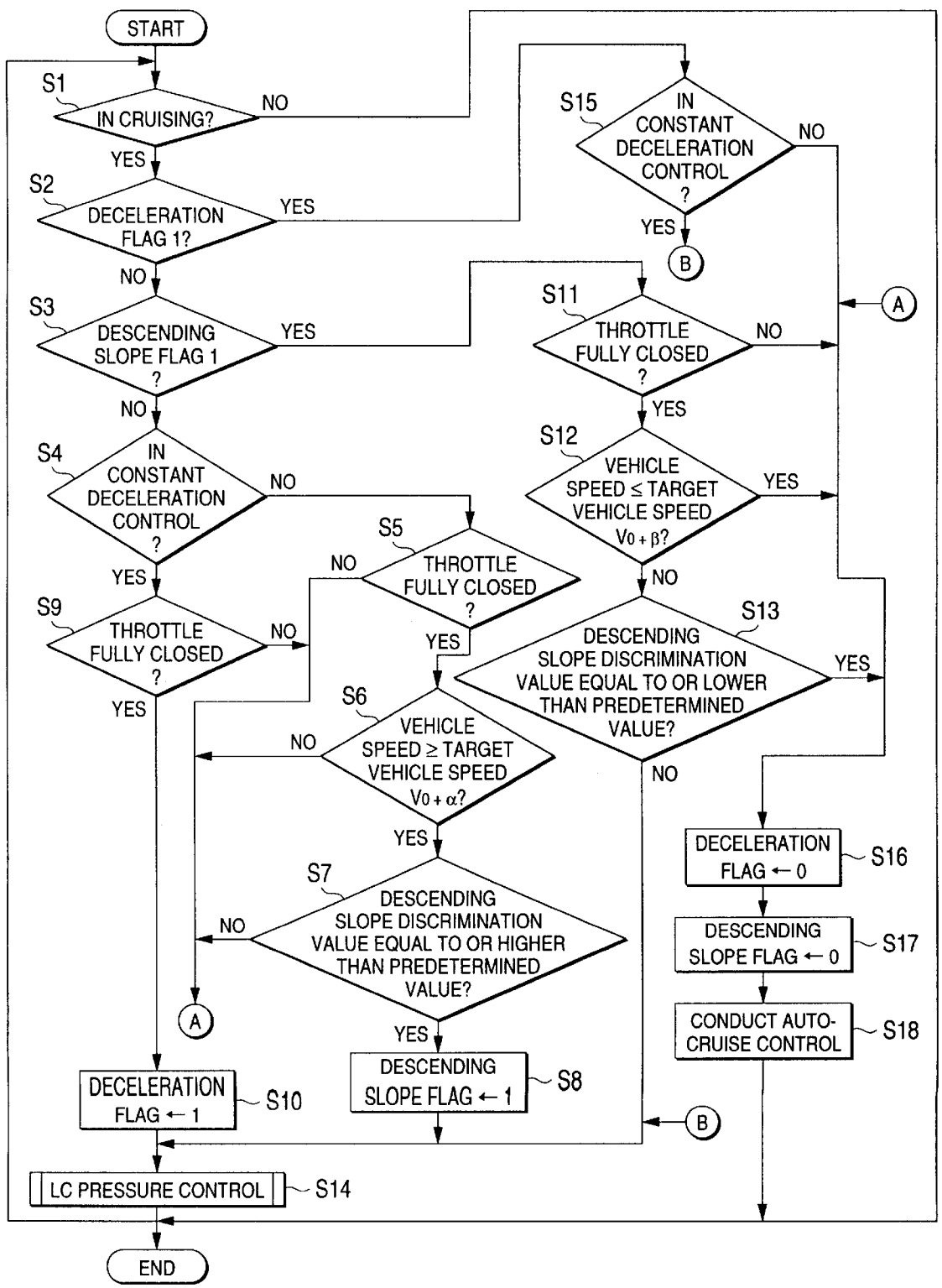
FIG. 12 is a flow chart showing steps of the LC pressure control at the time of the descending slope traveling and constant deceleration traveling of the vehicle.

FIG. 12 is a flow chart of the LC pressure control during slope descending condition of the vehicle and during the constant deceleration control in the automatic transmission control unit 4.

In the flow chart shown in FIG. 12, the LC pressure control at the time of the slope descending condition is as follows.

In the first control cycle, initially, in step S1, it is checked whether the vehicle is on cruising now, and when on cruising, the sequence advances to steps S2 and S3. At that time, because a deceleration flag and a descending slope flag are 0, the sequence advances to step S4, however, because the vehicle is not in the constant deceleration control, the sequence advances to step S5.

At the time of judgement of this step S5, when the throttle is fully closed, next in step S6, it is checked whether the actual vehicle speed V is equal to or higher than the target vehicle speed Vo+α (α is a predetermined constant), which is the starting point of the LC pressure control, and when the actual vehicle speed V is equal to or higher than the target vehicle speed Vo+α, the sequence advances to step S7, and it is judged whether the descending slope discrimination value is equal to or higher than a predetermined value.

At that time, when the descending slope discrimination value is equal to or higher than a predetermined value, in step S8, it is determined that the vehicle is on the slope descending condition, and the descending slope flag is set to 1, and in step S14, the LC pressure control is conducted.

Further, when each judgement result in steps S5 to S7 is NO, the deceleration flag is set to 0 in step S16, and the descending slope flag is set to 0 in step S17, and the auto-cruise control by the normal throttle angle adjustment is conducted in step S18.

Then, at the time of the next control cycle, when it is judged that the vehicle is on cruising now, in step S1, because the deceleration flag is 0 at this time, and the descending slope flag is 1, the sequence advances to step S11, and it is checked whether the throttle is fully closed. When the throttle is fully closed at that time, the LC pressure control is conducted in step S14 until it is judged that, in step S12, the actual vehicle speed V is equal to or lower than the target vehicle speed Vo+β (β is a predetermined constant), which is the completion point of the LC pressure control, or that, in step S13, the descending slope discrimination value is equal to or lower than a predetermined value, and the slope descending condition is completed.

After that, when it is judged that, in step S12, the actual vehicle speed V is equal to or lower than the target vehicle speed Vo+β or that, in step S13, the descending slope discrimination value is equal to or lower than a predetermined value, and the slope descending condition is completed, the sequence advances to step S16 and the deceleration flag is set to 0, and the descending slope flag is set to 0 in step S17, and in step S18, the system returns to the normal auto-cruise control, and processing of the LC pressure control at that time is completed.

In this connection, at the judgement time in step S11, even when the throttle is not fully closed, the auto-cruise control by the normal throttle angle adjustment is conducted in step S18, through steps S16 and S17.

Further, in the flow chart shown in FIG. 12, the LC pressure control during the constant deceleration control is as follows.

In this case, in the first control cycle, the sequence advances to step S4 through steps S1 to S3 in the same manner as described above, and then, it is judged that the system is under the constant deceleration control. Then, in step S9, it is judged whether the throttle is fully closed, and when the throttle is fully closed, the deceleration flag is set to 1 at step S10, and the sequence advances to step S14, and the LC pressure control is carried out.

In this connection, at the time of judgement in step S9, when the throttle is not fully closed, the deceleration flag is set to 0 in step S16, and the descending slope flag is set to 0 in step S17, and in step S18, the auto-cruise control by the normal throttle angle adjustment is conducted.

Then, at the time of the next control cycle, in step S1, when it is judged that the vehicle is cruising now, because the deceleration flag is 1, and the descending slope flag is 0, the sequence advances to step S15, and the LC pressure control is continuously conducted in step S14 until it is judged that the constant deceleration control is completed.

Then, when it is judged in step S15 that the constant deceleration control is completed, in step S16, the deceleration flag is set to 0, and in step S17, the descending slope flag is set to 0, and the system returns to the auto-cruise control by the normal throttle angle adjustment in step S18, and the LC pressure control processing at that time is completed.

Figure 13:
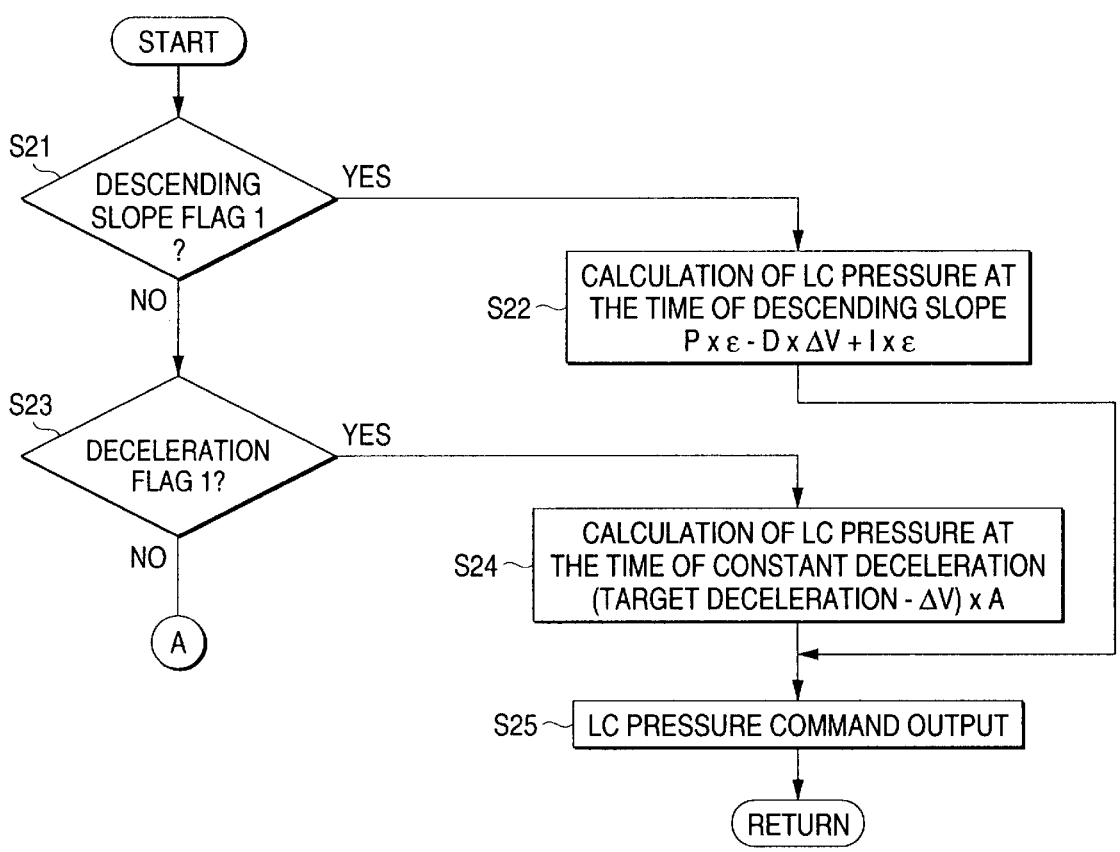
FIG. 13 is a flow chart showing concrete processing of the LC pressure control.

FIG. 13 shows a flow of concrete processing of the LC pressure control.

Herein, the fully closed condition of the throttle is kept, and in step S21, it is checked whether the descending slope flag is set to 1, and when the flag is 1, it is judged that the system is in the LC pressure control during the slope descending. In step S22, the LC pressure value required at that time is calculated, and in step S25, a command for the predetermined LC pressure is outputted to the LC pressure adjusting circuit 7 (refer to FIG. 1).

When the target vehicle speed at the time of slope descending is Vo', the difference from the actual vehicle speed V is ϵ, and the difference between the present actual vehicle speed and the last actual vehicle speed is Δv, then, the value of the LC pressure at the time of the slope descending is given by P×ϵ−D×Δv+I×ϵ. Where, P, D and I are predetermined weight coefficients.

Further, in step S21, when the descending slope flag is not 1, the sequence advances to step S23, it is checked whether the deceleration flag is 1, and when the deceleration flag is 1, it is judged that the system is in the LC pressure control during the constant deceleration. In step S24, the LC pressure value required in that case is calculated, and in step S25, a predetermined LC pressure command is outputted to the LC pressure adjusting circuit 7 (refer to FIG. 1).

A value of the LC pressure at the time of the constant deceleration is given by (the target deceleration−Δv)×A. Where, A is a predetermined weight coefficient.

As described above, according to the present invention, in the auto-cruise controller to control the throttle angle of the engine so that the actual vehicle speed is equal to the target vehicle speed, when the pressure control of the lock-up clutch of the automatic transmission is conducted based on an amount of the control of the lock-up pressure, calculated correspondingly to the difference between the actual vehicle speed and the target vehicle speed when the throttle is fully closed on the slope descending condition of the vehicle in the auto-cruise control, the occurrence of hunting of the fuel-cut caused by repeating the fully closed and slightly opened conditions of the throttle during the slope descending, can be surely prevented.

What is claimed is:

1. An auto-cruise controller in which a target vehicle speed is set, and a throttle angle of an engine is controlled so that a detected actual vehicle speed is equal to the target vehicle speed, said auto-cruise controller comprising:

means for controlling a pressure of a lock-up clutch in an automatic transmission with a lock-up mechanism;

means for judging a slope descending condition of a vehicle during an auto-cruising control; and means for calculating an amount to be controlled of the lock-up clutch pressure correspondingly to a difference between the actual vehicle speed and the target vehicle speed at the time of judgement of the slope descending condition, wherein the pressure control of the lock-up clutch is performed based on the amount to be controlled of the lock-up clutch pressure, which is calculated at the time of the judgement of the slope descending condition.

2. The auto-cruise controller according to claim 1, wherein said controlling means controls the pressure of the lock-up clutch under control of an automatic transmission control unit including said judging means and said calculating means.

* * * * *